United States Patent [19]

Seigenji

[11] Patent Number: 4,982,201

[45] Date of Patent: Jan. 1, 1991

[54] THERMAL HEAD

[75] Inventor: Takashi Seigenji, Minoo, Japan

[73] Assignee: Ricoh Company, Ltd., Tokyo, Japan

[21] Appl. No.: 332,620

[22] Filed: Apr. 3, 1989

[30] Foreign Application Priority Data

Apr. 8, 1988 [JP] Japan ............................ 63-48022[U]

[51] Int. Cl.$^5$ ......................... G01D 15/10; H05B 3/00

[52] U.S. Cl. ................................ 346/76 PH; 219/216

[58] Field of Search ..................... 346/76 PH; 219/216

[56] References Cited

U.S. PATENT DOCUMENTS 4,810,852 3/1989 Bakewell ............................ 219/216

4,841,120 6/1989 Yagino et al. ....................... 219/216

*Primary Examiner*—Bruce A. Reynolds

*Assistant Examiner*—Gerald E. Preston

*Attorney, Agent, or Firm*—Cooper & Dunham

[57] ABSTRACT

A thermal head of an end-heating type for use in printers or facsmiles comprises a non-conductive substrate having upper and under plain side surfaces and front end face and mounted at the under plain said surfaces thereof on a support member. The front end face of the substrate extending between the upper and under plain side surfaces is adapted to be held in sliding contact with a recording medium such as thermo-sensitive sheet or ink transfer sheet. A plurality of spaced heat-generating resistors for forming heat-generating dots are provided on the upper plain surface of the substrate and arranged along the front end face of the substrate. Each of the heat-generating resistors has a front end which extends closely adjacent to the front end face of the substrate. Electrodes for feeding electricity to the heat-generating resistors are also provided on the upper plain side surface of the substrate. The heat-generating resistors and electrodes can be easily formed only on the upper plain side surface of the substrate by an ordinary film formation process.

6 Claims, 1 Drawing Sheet

THERMAL HEAD

BACKGROUND OF THE INVENTION

The present invention relates to a thermal head for use in video printers, handy printers, facsimiles or the like. More particularly, the invention relates to a thermal head of an end-heating type in which a front end of a non-conductive substrate having thereon a plurality of heat-generating resistors is adapted to be held in sliding contact with a recording medium to effect printing.

Generally, a thermal head for use in printers or facsimiles basically comprises a non-conductive substrate adapted to be held in sliding contact with the recording medium. A plurality of heat-generating resistors for forming heat-generating dots and electrodes for feeding electricity to the heat-generating resistors are formed on the surface of the non-conductive substrate. In order to decrease the manufacturing cost of thermal heads, it is desirable to form such heat-generating resistors and electrodes by a film formation process utilizing photolithography.

There has been known a thermal head of a plain surface-heating type in which a plain surface of a non-conductive substrate having thereon a plurality of heat-generating resistors is adapted to be held in sliding contact with a recording medium to effect printing. In the plain surface-heating type thermal head, it is easy to form such heat-generating resistors and electrodes on the plain surface of the non-conductive substrate by a film pattern formation process utilizing photolithography. However, the thermal head of this type has the following disadvantages:

(1) Distribution of pressure acting on a recording medium such as ink ribbon from the thermal head is apt to become uneven, resulting in deterioration of quality of printed picture, particularly in an image printer of a dye transfer type;

(2) It is difficult to effect print on a plain recording medium;

(3) It is difficult to construct a multi-thermal head for color printing; and (4) Configuration of non-conductive substrate depends on the diameter of a platen roller.

There has also been known a thermal head of an end-heating type which can eliminate the above-mentioned disadvantages of the thermal head of the plain surface-heating type.

However, in a thermal head of an end-heating type, it is very difficult to directly form such heat-generating resistors and electrodes in the form of three-dimentional configuration on the surface of the non-conductive substrate within the region from the front end through the upper or under side of the non-conductive substrate.

An exemplary thermal head of an end-heating type is decribed in Japanese Unexamined Utility Model Publication (KOKAI) No. 63-125544. In this construction, a plurality of heat-generating resistors and electrodes can be formed on a plain flexible sheet by a film formation process. However, then, the flexible sheet has to be bended in the form of a U-shape and secured on the the upper and under sides and the front end of the non-conductive substrate so as to place the heat-generating resistors on the front end of the non-conductive substrate, resulting in increase of the number of manufacturing process of the thermal head.

SUMMARY OF THE INVENTION

It is therefore an object of the present invention to provide a thermal head of an end-heating type which can be easily manufactured by utilizing an ordinary film formation process.

The object of the present invention can be achieved by a thermal head of an end-heating type comprising: a non-conductive substrate having opposite plain side surfaces and front end face and mounted at one of the plain side surfaces thereof on a support member, the front end face extending between the plain side surfaces and being adapted to be held in sliding contact with a recording medium; and a plurality of spaced heat-generating resistors for forming heat-generating dots, provided on the other plain surface of the non-conductive substrate and arranged along the front end face of the non-conductive substrate, each of the heat-generating resistors having a front end extending closely adjacent to the front end face of the non-conductive substrate.

In the thermal head of the present invention, the heat-generating resistors are provided only on the plain surface of the non-conductive substrate. Accordingly, the heat-generating resistors can be easily formed by an ordinary film formation process utilizing photolithography, resulting in a low manufacturing cost of the thermal head. Since the heat-generating resistors in the present invention are arranged along the front end of the non-conductive substrate, and each of the heat-generating resistors has a front end extending closely adjacent to the front end of the non-conductive substrate, the thermal head can effect printing on a recording medium at the front end of the non-conductive substrate, with the front end face of the non-conductive substrate held in sliding contact with the recording medium.

Preferably, each of the heat-generating resistors is connected at a rear end portion thereof to a pair of spaced electrodes which are provided on the other plain surface of the non-conductive substrate and superposed on the rear end portion. One of the electrodes is connected to a chip of integrated circuit for driving the heat-generating resistors through a lead member, while the other electrode is integrally formed with a common electrode which is provided on the other plain surface of the non-conductive substrate and extends along a rear end of the non-conductive substrate. In this construction, preferably, each of the heat-generating resistors is formed at the rear end portion thereof with forked branches extending in parallel to each other, and the electrodes are superinposed on the branches, respectively.

In the thermal head having the above-mentioned construction, the heat-generating resistors and electrodes are provided only on the plain surface of the non-conductive substrate. Accordingly, the heat-generating resistors and electrodes can be easily formed by an ordinary film formation process utilizing photolithography, resulting in a low manufacturing cost of the thermal head.

Preferably, the chip of integrated circuit is mounted on a circuit wiring board which is mounted on the support member and positioned adjacent to the rear end of the non-conductive substrate, the common electrode being connected to an additional common electrode provided on the circuit wiring board through lead members. In this construction, both the common electrode on the substrate and the additional common electrode on the circuit wiring board have a total current capacity necessary for feeding a large amount of current into the heat-generating resistors. Accordingly, it is possible to decrease the size of the substrate and the common electrode on the substrate, while maintaining a total current capacity necessary for feeding a large amount of current into the heat-generating resistors. As the result, it is possible to mass-produce small-sized substretes having the heat-generating resistors and the electrodes in a low cost by a thin film formation process.

Preferably, a protective board for protecting the heat-generating resistors against oxidation and wear is secured on the heat-generating resistors along the front end face of the non-conductive substrate. The protective board has a front end extending closely adjacent to the front end of each of the heat-generating resistors. According to this construction, the thermal head has a long durability.

It is to be understood that the thermal head of the present invention may be used with a thermo-sensitive recording sheet or an ink transfer sheet such as a color ink ribbon or a wax ribbon combined with a normal recording sheet. The thermal print head also may be used as a thermal head having gradation reproducibility.

Further objects and advantages of the present invention will become apparent from the following description of the preferred embodiment of the invention as illustrated in the accompanying drawings.

DESCRIPTION OF THE PREFERRED EMBODIMENTS

Figure 1:
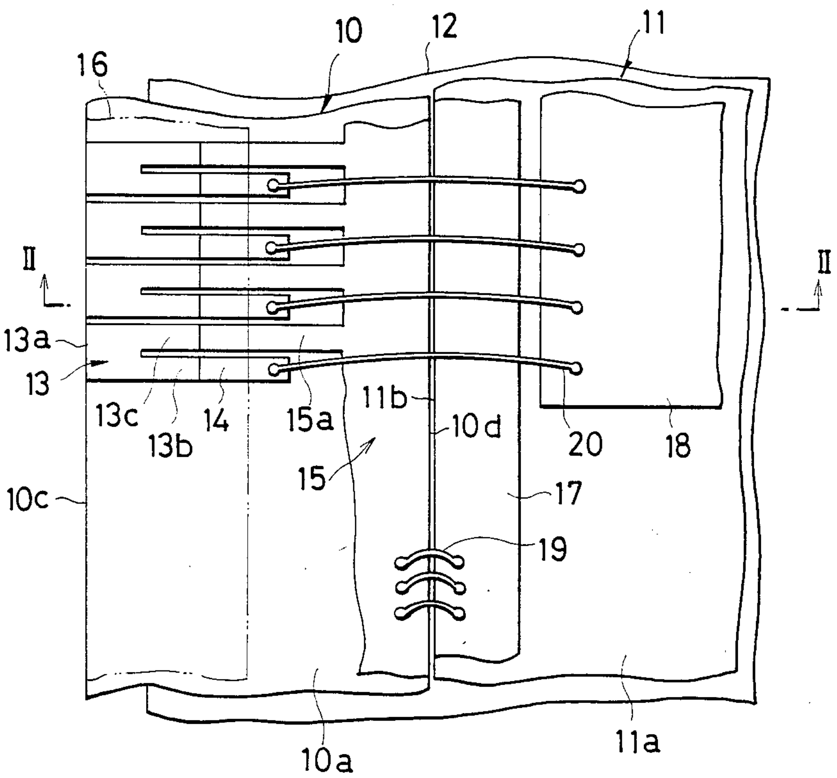
FIG. 1 is a schematic fragmentary plan view of a thermal head of an end-heating type according to a preferred embodiment of the present invention.
Figure 2:
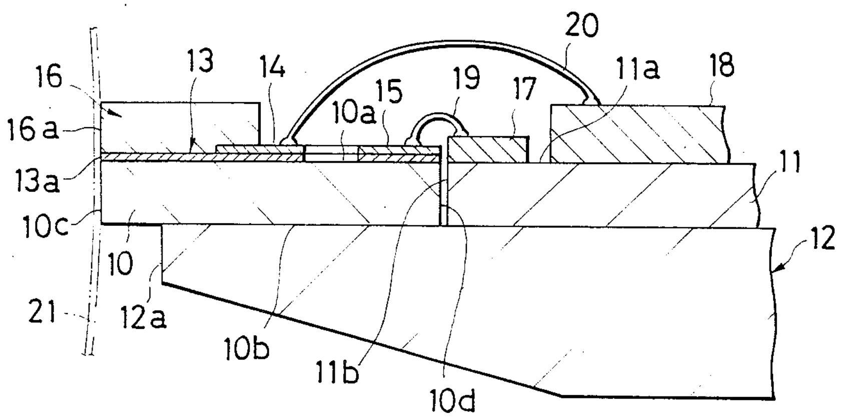
FIG. 2 is a sectional view of the thermal head taken along the line 2—2 in FIG. 1.

FIGS. 1 and 2 illustrate an essential part of the thermal head of an end-heating type according to a preferred embodiment of the present invention.

Referring to FIGS. 1 and 2, the thermal head comprises a non-conductive substrate 10 and a circuit wiring board 11 which are fixedly mounted on a plain surface of a support member 12 by an adhesive (not shown) so as to be placed adjacent to each other. The support member 12 serves as a heat radiator. More particularly, the non-conductive substrate 10 has opposite first and second plain side surfaces 10*a* and 10*b* and front and rear end faces 10*c* and 10*d* and fixedly mounted at the second plain side surface 10*b* on the support member 12. The front and rear end faces 10*c* and 10*d* extend in perpendicular to the plain side surfaces 10*a* and 10*b* and in parallel to each other. As shown in FIG. 2, the front end face 10*c* of the substrate 10 is projected outwardly from a front end 12*a* of the support member 12 so as to be held in sliding contact with a recording medium 21.

Formed on the upper mount surface 10*a* of the non-conductive substrate 10 are a plurality of spaced heat-generating resistors 13 which are arranged along the longitudinal direction of the front end face 10*c* of the substrate 10. A clearance is defined between adjacent two heat-generating resistors 13.

Each of the heat-generating resistors 13 has a front end 13*a* which is positioned closely adjacent to the front end face 10*c* of the substrate 10. Further, each resistor 13 is patterned at its rear portion in the form of forked shape having a first and second rear ends 13*b* and 13*c*. The first rear ends 13*b* of the resistors 13 are directly connected to individual electrodes 14, respectively, superposed thereon. The second rear ends 13*c* of the resistors 13 are connected to a common electrode 15 through electrode branches 15*a* which are integrally formed with the common electrode 15 and superposed on the second rear ends 13*c* of the resistors 13. The common electrode 15 is formed on the upper mount surface 10*a* of the substrate 10 and extends along the longitudinal direction of the rear end face 10*d* of the substrate 10.

For the purpose of protection of the heat-generating resistors 13 against oxidation and wear, a protective board 16 made of glass or grassy material is secured on the resistors 13 by an adhesive such as epoxy resin or polyimide. The protective board 16 has a front end face 16*a* which is positioned closely adjacent to the front ends 13*a* of the resistors 13. Therefore, the front end face 10*c* of the substrate 10, the front ends 13*a* of the resistors 13, and the front end face 16*a* of the protective board 16 are laid in the same plane.

The circuit wiring board 11 has an upper plain surface 11*a* and a front end face 11*b*. Formed on the upper plain surface 11*a* of the wiring board 11 is an additional common electrode 17 which extends along the longitudinal direction of the end surface 11*b* of the board 11. The additional common electrode 17 on the circuit wiring board 11 is connected to the common electrode 15 on the substrate 10 by a plurality of lead wires 19.

Also provided on the upper plain surface 11*a* of the wiring board 11 is a chip of semiconductor integrated circuit (referred to as IC chip hereinafter) 18 which serves as a drive circuit for the heat-generating resistors 13. The IC chip 18 has a plurality of bonding pads (not shown) which are connected to the individual electrodes 14 by lead wires 20, respectively.

A substrate made of glass or ceramics, such as alumina ceramics, or the like may be used for the non-conductive substrate 10. When the ceramic substrate is used, it is desirable to coat the surface thereof with a glassy glaze layer. Further, a ceramic board or a laminated board made of epoxy resin reinforced with glass cloths may be used for the circuit wiring board 11, and a metal board made of alminium or stainless steel may be used for the support board 12.

The heat-generating resistors 13 are made of resistive material such as, for example, Ta-$SiO_2$. The heat-generating resistors 13 and electrodes 14, 15 and 15*a* can be formed on the non-conductive substrate 10 in the form of a film layer by a film formation process utilizing photolithography. In this case, a first thin film layer made of, for example, Ta-$SiO_2$, for the heat-generating resistors is firstly formed on the upper side surface 10*a* of the substrate 10, and then a second thin film layer made of, for example, gold (Au), for the electrode is formed on the first thin film layer. The first and second film layers are then subjected to a photo etching process to form necessary patterns thereof, resulting in the formation of the heat-generating resistors 13 and electrodes 14, 15 and 15*a*.

The additional common electrode 17 may be made of a gold (Au) layer plated on a copper (Cu) layer which is plated on the circuit wiring board 11. It is possible to form the common electrode 17 on the circuit wiring board 11 by a thick film process. Although the common electrode 17, in the illustrated embodiment, is formed on the upper plain surface 11*a* of the circuit wiring board 11 so as to extend along the non-conductive substrate 10, the electrode 17 may be formed, for example, under the IC chip 18, while insulated therefrom.

In the thermal head having the above-mentioned construction, the heat-generating resistors 13 and electrodes 14, 15 and 15*a* are provided only on the plain surface 10*a* of the non-conductive substrate 10. Accordingly, the heat-generating resistors 13 and electrodes 14, 15 and 15*a* can be easily formed by an ordinary film formation process utilizing photolithography, resulting in a low manufacturing cost of the thermal head.

Although in the illustrated embodiment, wire bonding is employed for electric connection between the individual electrodes 14 and the IC chip 18 and between the two common electrodes 15 and 17, tape automating bonding (TAB) using tape carriers can be employed for the same purpose.

While the invention has been described in conjunction with specific embodiments thereof, it is evident that many alternatives, modifications, and variations will be apparent to those skilled in the art in light of the foregoing description. Accordingly, it is intended to include all such alternatives, modifications and variations as fall within the spirit and scope of the appended claims.

What is claimed is:

1. A thermal head of an end-heating type comprising:

a support member;

a first non-conductive substrate having first and second opposite plain side surfaces and a front end face, said first non-conductive substrate being mounted at its first plain side surface on said support member, said front end face extending between said first and second plain side surfaces and being adapted to be held in sliding contact with a recording medium;

a plurality of spaced heat-generating resistors for forming heat-generating dots, disposed on the second plain surface of said first non-conductive substrate and having front ends arranged along said front end face of said first non-conductive substrate, said front ends of said heat-generating resistors extending closely adjacent to said front end face of said first non-conductive substrate, and each of said heat-generating resistors having a first and second rear portions extending away from said front ends along said second surface of said first non-conductive substrate;

spaced electrodes disposed on said second plain surface of said first non-conductive substrate and superposed on first rear portions of respective ones of said heat-generating resistors;

a second non-conductive substrate having first and second opposite plain side surfaces and mounted at its first plain side surface on said support member;

an integrated circuit chip disposed on the second plain surface of said second non-conductive substrate for driving said heat-generating resistors;

lead members connecting said electrodes to said integrated circuit chip; and a common electrode disposed on said second plain surface of said first non-conductive substrate and extending along a rear end of said first non-conductive substrate and being integrally formed with said second rear portions of said heat-generating resistors.

2. A thermal head according to claim 1, wherein the rear portion of each of said heat-generating resistors is forked to form said first and second rear portions and said first and second rear portions extend rearwardly in parallel to each other.

3. A thermal head according to claim 1 including a circuit wiring board mounted on said support member and positioned adjacent a rear end of said second non-conductive substrate, and an additional common electrode disposed on said second non-conductive substrate, wherein said integrated circuit chip is mounted on said circuit wiring board, and including lead connecting said common electrode disposed on said first non-conductive substrate and said additional common electrode provided on said circuit wiring board through lead members.

4. A thermal head according to claim 1 including a protective board for protecting said heat-generating resistors against oxidation and wear, secured on said heat-generating resistors along said front end face of said first non-conductive substrate, said protective board having a front end extending closely adjacent to said front end of each of said heat-generating resistors.

5. A thermal head according to claim 1 wherein each of said first non-conductive substrate and second non-conductive substrate is a ceramic substrate coated with a glassy glaze layer.

6. A thermal head according to claim 1, wherein each of said heat-generating resistors is made of Ta-$SiO_2$ film.

* * * * *